United States Patent [19]

Chich et al.

[11] Patent Number: 4,923,913
[45] Date of Patent: May 8, 1990

[54] LOW TEMPERATURE SEALING ADHESIVE COMPOSITION

[75] Inventors: Adem Chich, Kearny; Steven S. Lalwani, Upper Montclair; Steven C. Bettoli; Louis L. Grube, both of Bound Brook; Alfredo A. Bondoc, South Bound Brook, all of N.J.

[73] Assignee: GAF Building Materials Corporation, Wayne, N.J.

[21] Appl. No.: 292,408

[22] Filed: Dec. 30, 1988

[51] Int. Cl.$^5$ .................... C08L 95/00; C08L 51/02; C08K 5/12; C08K 5/01
[52] U.S. Cl. ........................................ 524/62; 524/68; 524/70; 524/71
[58] Field of Search ............... 524/59, 62, 68, 70, 524/71

[56] References Cited

U.S. PATENT DOCUMENTS 4,385,142 5/1983 Böhm et al. ........................ 524/70
4,824,880 4/1989 Algrim et al. ...................... 524/68

OTHER PUBLICATIONS

Abstract of Japanese Patent 56-5853, Satoyoshi et al., 1/81.

*Primary Examiner*—Allan M. Lieberman
*Attorney, Agent, or Firm*—Jules E. Goldberg; Marilyn Maue; Joshua J. Ward

[57] ABSTRACT

An adhesive composition for roofing such as shingles is disclosed which is composed of a hard asphaltic bitumen fraction having a penetration number at 77° F. of from 0 to 30 dmm and a softening point of from about 150° to 220° F. and an elastomeric composition composed of a thermoplastic elastomer and a plasticizer wherein the overall adhesive composition has a penetration number of from 30 to 100 dmm at 130° F. and a softening point of 140° to 230° F. The inventive composition is self-sealing and exhibits excellent squash resistance, low temperature properties and resistance to blowoff. The composition can be used with shingles as well as other types of roofing coverings.

19 Claims, No Drawings

LOW TEMPERATURE SEALING ADHESIVE COMPOSITION

BACKGROUND OF THE INVENTION

I. Field of the Invention

This invention relates to a novel blend of bituminous and synthetic rubber components which provides a superior low temperature sealing adhesive. More particularly, the invention relates to a self-sealing composition for roofing shingles and shingles having the composition thereon.

II. Description of the Prior Art

Many blends of bituminous material have been proposed which meet certain specifications but which are lacking in others, particularly specifications for roofing adhesives. Among the requirements for a self-sealing adhesive are resistance to crush when the shingles are packed in stacks for shipment, a relatively low melting temperature to permit self-sealing without the application of heating equipment and a strong bond between the joined surfaces which has high wind resistance and good low temperature stability. Other important considerations include good resistance to photo-oxidation; in particular, the ability to retain adhesive properties after exposure of the adhesive to sunlight for more than two hours. While certain of these characteristics are found in conventional blends, a combination of all of the above-mentioned properties has not been attained.

For example, U.S. Pat. No. 3,978,014 describes blends having high aromaticity and at least 8% rubber content. While these blends exhibit good thermal stability, their self-sealing properties are relatively poor. Also, because or their high aromaticity, these blends are readily degraded by exposure to UV light during roof installation. U.S. Pat. No. 4,559,267 also discloses roofing adhesive blends. However these include substantial amounts of bitumen roofers flux in their composition which produces a tacky sealant leading to rider granule problems and packaging difficulties as exemplified by low squash resistance and premature adhesion of shingles when shipped in bundles and during installation.

Another problem with the prior art adhesive compositions is that they are essentially "contact adhesives". In other words, the primary strength of the bond formed by the adhesive composition is at the surface of the shingle. Thus, while the adhesives are relatively soft, they exhibit extremely slow flow properties at temperatures of 90° to 100° F. This means that the adhesive does not flow into the shingle and the bond remains essentially at the surface thereof. A stronger bond is formed between shingle layers when the adhesive composition flows partially into the contacting face of the shingle. Such an adhesive might be referred to as a "migrating" adhesive. Consequently, it is desired to have such a "migrating" property at low temperatures of 90° to 100° F. in order to provide stronger bonds and better wind resistance.

U.S. Pat. No. 4,755,545 describes a self-sealing adhesive blend composed of a bituminous component of 100 percent of a road paving grade asphalt or a blend of such a road paving asphalt with a hard resin asphalt, 1 to 6% by weight of a thermoplastic styrene/butadiene block copolymer and 4 to 40% by weight of an inert filler. This composition does provide some improvement with respect to squash resistance, reduced tackiness and improved low temperature stability. It is pointed out that the bituminous component must have an ACI of less than 0.26 and it is essential that the asphaltene content be less than 20%. The road paving asphalt is a material having a penetration at 77° F. of between 40-80 dmm and a softening point of between 110° F. and 130° F.

The composition of U. S. Pat. No. 4,755,545 presents additional problems with respect to processing such as, mixing difficulty in the dissolution of the elastomer thus requiring more elaborate equipment, e.g., homogenizers, high shear mixers, and the like.

SUMMARY OF THE INVENTION

We have discovered an adhesive composition which is non-tacky, exhibits a high hardness and yet possesses excellent flow properties at low temperatures and thus permits strong bonding between roofing shingles and other roofing coverings. The adhesive composition of the invention also exhibits excellent cold temperature strength.

More particularly, this is achieved in an adhesive composition for use with roofing shingles comprising: (a) a hard asphaltic bitumen fraction having a penetration number at 77° F. of from 0 to 30 dmm and a softening point of from about 150. to 220° F. (penetration number determined by ASTM D-5); and b) an elastomeric composition comprising a thermoplastic elastomer and a plasticizer selected from the group consisting of petroleum derived oils, such as, aromatics and naphthenics, or phthalate esters, phthalate ester derivatives, and mellitates, said plasticizer having a flashpoint equal to or greater than 250° F. (COC) and a boiling point equal to or greater than 250° F., wherein the amount of plasticizer in the composition is such that the overall composition has a penetration number of from 30 to 100 dmm at 130° F. (in the absence of fillers) and a softening point of 140° to 230° F..

DESCRIPTION OF THE PREFERRED EMBODIMENT

The hard asphaltic bituminous fraction of the present invention may be a propane cut bitumen, a petroleum bottoms asphalt modified by oxidation or mixtures thereof.

Thermoplastic elastomers suitable for use in the elastomeric composition component of the inventive adhesive composition include any rubber which is thermally processable, such as, styrene-butadiene-styrene, styrene-ethylene-butylene-styrene, and ethylene propylene. The elastomeric composition also contains a plasticizer in an amount from about 1 to 80% by weight, and preferably, from about 10 to 70% by weight based on the weight of the elastomeric composition. Generally, when an oil is used rather than a phthalate or mellitate, the amount of plasticizer in the thermoplastic elastomer is higher.

Preferred plasticizers include, $C_{7-12}$ alkylphthalates or dialkylphthalates, and $C_{7-12}$ alkylmellitates including trialkylmellitates. Illustrative of this group are trioctylmellitate, dioctylphthalate, and diundecylphthalate.

Generally, the elastomeric composition is present in an amount from about 1 to 20% by weight and preferably, from about 2 to 14% by weight based on the total weight of the adhesive composition. The bituminous fraction is then generally present in an amount from about 99 to 80% by weight, and preferably, from 98 to 86% by weight based on the total weight of the elastomeric composition.

It is possible to add conventional fillers, such as, for example, stone dust, limestone, ground glass fibers, and ground tires which can add strength to the composition, wollastonite, clay, sand, talc, mica, vermiculite, pearlite, carbon black and titanium oxide, which possess anti-oxidant and UV resistant properties as well as the ability to add strength to the blended material. Normally, the amount of filler added would be in the range from about 5 to 50% based on the total weight of the adhesive composition, and preferably, from about 10 to 40% by weight.

Although not required, the present composition may also contain a small amount of antioxidant, such as, a stearically hindered phenolic compound having a linear, branched or radial molecular structure. When used, these compounds are required to have a high decomposition temperature, e.g., greater than 400° F., to withstand mixing temperatures employed in the preparation of the blend. Preferred antioxidants which may be incorporated are those having a decomposition and volatile loss temperature greater than 400° F.. Typical species include IRGANOX 1010 supplied by Ciba-Geigy, i.e., tetrakis [methylene(3,5-di-tert-butyl-4-hydroxyhydrocinnamate)] methane which has a radial structure and an empirical formula of $C_{72}H_{108}O_{12}$, the antioxidants covered in U.S. Pat. Nos. 3,285,855 and 3,644,482, AGERITE GT (an isocyanurate based hindered phenol supplied by R.T. Vanderbilt), and the like. When included in the formulation, e.g., in cases where a small amount of filler, e.g., less than 10%, is used, the antioxidants may comprise between about 0.05 and about 5% by weight, preferably not more than about 3% by weight of the total composition.

It is also possible to add plasticizer to the adhesive composition in addition to that contained in the elastomeric composition. Typically, the amount added would be from about 0.25 to 15% by weight based on the weight of the adhesive composition.

Overall, the adhesive composition, including all additives, will have a softening point in the range from about 160° to 230° F., and preferably, from about 165° to 200° F.

The adhesive composition of the present invention may be prepared by heating the asphaltic bitumen fraction to a molten temperature and then adding the elastomeric composition containing the plasticizer thereto. Thereafter, any additional materials, e.g., fillers and the like, can be blended into the mixture.

An important advantage of the present invention can be obtained when plasticizer in addition to that contained in the elastomeric composition is utilized. In this case, the additional plasticizer can be added to the molten asphaltic fraction prior to the addition of the elastomeric composition. This pre-addition of the plasticizer aids significantly in the mixing and complete blending of the subsequently added elastomeric composition. As a result, conventional type mixing vessels and stirrers can be utilized as opposed to more specialized high shear blending equipment and homogenizers.

The inventive adhesive composition may be applied to a roofing element, such as, a shingle or continuous or rolled roofing sheet in the form of an adhesive strip or bead or in a pattern of beads or other configuration along an area which is to be contacted with a second roofing element, e.g., on the under surface or over surface of the roofing material where overlap or underlap of succeeding shingles or strips occur. The same application can be effected to seal siding shingles or sheets.

The inventive adhesive composition may also be used as a hot melt for built-up roofs and the like.

For preparing coated shingles, the shingle material is passed over or under an applicator containing the present blend at a temperature of from about 250° F. to about 400° F..

The applicator can be a set of print wheels or an extruder capable of applying adhesive in beads of consistent size or as a continuous ribbon on a surface of the material to be joined and sealed to another member. After affixing the adhesive in the desired area or areas, the adhesive is quenched with water, air cooled or cooled by contact with any suitable quenching media.

Generally the material on which adhesive is applied is cut to size after application, however, it is also within the scope of this invention to precut shingles or sheets which may be subsequently presented to the applicator for adhesive application.

The following examples illustrate typical formulations of the adhesive composition of the present invention.

EXAMPLE 1

In a typical plant trial, approximately 1500 pounds asphalt resin (PEN @ 130° F.=20 to 60 dmm, per ASTM D-5, except that the total needle weight was 50 g and the temperature 130° F.) was pumped into a mix tank and heated to 300 to 380° F., preferably 350° to 380° F. When the resin penetration number at 130° F. fell below 40, 1-2 percent of a plasticizer (based on the weight of the hard asphalt resin) was added (in this case, the plasticizer was a dialkylphthalate).

The mixture was stirred utilizing a conventional propeller mixer; 4-8% by weight of an oiled styrene-butadiene-styrene rubber was slowly added and stirring was continued. The styrene-butadiene rubber added was either Finaprene produced by Fina Oil Company, or Kraton produced by Shell Chemical Co. These rubbers contain from approximately 20 to 55% by weight naphthenic and/or aromatic oils with a balance being a block copolymer of styrene-butadiene-styrene having a tensile strength of 4,000-500 psi (ASTM D-412) an elongation of 800 to 900% (ASTM D-412), a Brookfield viscosity (toluene solution) at 77° F. of 4,000-20,000 cps and a styrene to rubber ratio of 25-35 : 75-65.

The styrene-butadiene rubber dissolved in approximately 30 minutes. 30% by weight, based on the total weight of the blend of a limestone filler was then added and stirring was continued to thoroughly blend the filler into the mixture. Thereafter, the temperature of the mix was decreased to about 300° F. and the mix was pumped into an application tank for application to shingles. The application temperature for the composition was from about 280° to 300° F..

Shingles were then prepared utilizing the conventional application method as described above and outlined in U.S. Pat. No. 4,755,545 in connection with the drawing therein.

EXAMPLE 2

The following illustrates the optimum composition in accordance with the present invention.

| (1) Optimum | |
|---|---|
| Asphalt resin (propane extract or oxidized bitumen) S.P. 194° F. PEN @ 130° F. = 23 dmm/ZECO AA-1021* | 60% |
| Filler (limestone) | 30% |
| Thermoplastic rubber (SBS) Shell Kraton 4460 (oiled) | 8% |

-continued

| Co-polymer compatible plasticizer (phthalate ester) BASF 711P | 2% |

Final softening point (R&B): 190° F.
Penetration (before stabilizer) @ 130° F.: 59 dmm

*All softening points (S.P.) expressed herein are determined by the ring and ball method, A.S.T.M.-D-36.

What is claimed is:

1. An adhesive composition comprising:
   (a) a hard asphaltic bitumen fraction having a penetration number at 77° F. of from 0 to 30 dmm and a softening point of from about 150° to 220° F., and
   (b) an elastomeric composition comprising a thermoplastic elastomer and a plasticizer, said plasticizer having a flash point equal to or greater than 250° F. and a boiling point equal to or greater than 250° F. and being present in an amount from about 1 to 80 percent by weight of the elastomeric composition; wherein the amount of plasticizer in the adhesive composition is such that the mixture has a penetration number of from 30 to 100 dmm at 130° F. and a softening point of 140° to 230° F. and wherein the amount of bitumen fraction is about 99 to 80 percent by weight and the amount of elastomeric composition is from about 1 to 20 percent by weight, based on the total amount of the bitumen and elastomeric composition.

2. The adhesive composition of claim 1 wherein the asphaltic fraction is propane cut bitumen, a petroleum bottoms asphalt modified by oxidation and mixtures thereof.

3. The adhesive composition of claim 1 wherein the thermoplastic elastomer is selected from the group consisting of styrene-butadiene-styrene, styrene-ethylene-butylene-styrene, and ethylene propylene.

4. The adhesive composition of claim 1 wherein the plasticizer is selected from the group consisting of petroleum derived oils, phthalate esters, phthalate esters derivatives, and mellitates.

5. The adhesive composition of claim 1 wherein the amount of plasticizer is from about 10 to 70 percent by weight based on the weight of the elastomeric composition.

6. The adhesive composition of claim 1 wherein the amount of elastomeric composition is from about 2 to 14 percent by weight based on the total weight of the adhesive composition.

7. The adhesive composition of claim 1 wherein the amount of bitumen fraction is from about 98 to 86% by weight.

8. The adhesive composition of claim 1 wherein additional plasticizer other than that contained in the elastomeric composition is present.

9. The adhesive composition of claim 8 wherein the amount of additional plasticizer is from about 1.25 to 20% by weight based on the total weight of the adhesive composition.

10. The adhesive composition of claim 1 which further comprises a filler.

11. The adhesive composition of claim 10 wherein the amount of filler is from about 5 to 50% based on the total weight of the adhesive composition.

12. The adhesive composition of claim 10 wherein the softening point of the adhesive composition is from about 160° to 230° F.

13. A method for preparing the adhesive composition of claim 1 comprising heating the asphaltic bitumen fraction to a molten state and admixing the elastomeric composition into the molten bitumen fraction.

14. The method of claim 13 wherein the bitumen fraction is heated to a temperature of from about 300° to 380° F.

15. The method of claim 13 wherein prior to adding the elastomeric composition, additional plasticizer is added to the molten bitumen fraction.

16. The method of claim 13 wherein the thermoplastic elastomer is selected from the group consisting of styrene-butadiene-styrene, styrene-ethylene-butylene-styrene, and ethylene propylene.

17. The method of claim 16 wherein the plasticizer is selected from the group consisting of petroleum derived oils, phthalate esters, phthalate esters derivatives, and mellitates.

18. The method of claim 15 wherein the amount of additional plasticizer added is sufficient to increase the penetration number of the asphalt fraction to 40 dmm or above at 130° F.

19. An adhesive composition comprising:
   (a) about 60 weight percent of a bituminous fraction selected from the group consisting of propane extracted asphalt resin or oxidized bitumen;
   (b) about 30 weight percent of limestone;
   (c) about 8 weight percent of a thermoplastic rubber of styrene-butadiene block copolymer containing from about 20 to 55 percent by weight plasticizer; and
   (d) about 2 percent by weight of a phthalate ester plasticizer.

* * * * *